Nov. 3, 1959   J. E. HECKETHORN   2,910,891
ACCESSORY DRIVES FOR AUTOMOTIVE VEHICLES
Filed March 17, 1958   2 Sheets-Sheet 1

INVENTOR.
John E. Heckethorn
BY
ATTORNEY

Nov. 3, 1959     J. E. HECKETHORN     2,910,891

ACCESSORY DRIVES FOR AUTOMOTIVE VEHICLES

Filed March 17, 1958     2 Sheets-Sheet 2

INVENTOR.
John E. Heckethorn
BY
ATTORNEY

United States Patent Office 2,910,891
Patented Nov. 3, 1959

2,910,891

ACCESSORY DRIVES FOR AUTOMOTIVE VEHICLES

John E. Heckethorn, Dyersburg, Tenn., assignor to Heckethorn Manufacturing & Supply Co., Dyersburg, Tenn., a corporation of Colorado Application March 17, 1958, Serial No. 721,735

10 Claims. (Cl. 74—722)

This invention relates to a two-speed accessory drive for automobiles. The engines of present-day automobiles are required to perform many tasks in addition to that of driving the vehicle, such as driving the engine cooling fan, the water pump, the generator, and, in some cases, for driving a Freon compressor for air conditioning, and, in other cases, air compressors and hydraulic pumps for operating various equipment on an automotive vehicle or truck. If the above-enumerated accessories are connected direct to the engine, they will be driven throughout the multitude of varying speeds to which an automotive vehicle is subjected. If the drive is designed to provide satisfactory output for the generator, Freon compressor, or other equipment at a town driving speed of, say, twenty-five miles an hour, the equipment will be driven at an unnecessary high speed whenever the vehicle exceeds the given speed of twenty-five miles an hour. This results in unnecessary power consumption, inefficient accessory operation, and damage and rapid wear on the accessories. On the other hand, if the conventional accessory drive is arranged to transmit satisfactory operating speed to the equipment at high speeds, the r.p.m. of the equipment at low speeds will not be sufficient to perform the tasks for which the accessories are designed.

The principal object of this invention is to avoid the above objections to conventional drives by providing a drive for driving accessory equipment from an automotive engine which will operate the accessories at a high drive ratio at low speeds and which will automatically shift to a lower drive ratio when the car speed has increased to a predetermined point so as to provide highly efficient engine cooling, power generation, and improved accessory operation at low and idling speeds and reduced power consumption and reduced wear and tear at higher speeds.

Another object of the invention is to so provide an improved two-speed accessory drive which will be economical to manufacture, exceedingly rugged and long-lived in use, substantially trouble-free and automatic in its operation, and which will accomplish the desired results with a minimum of working parts.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figures 1, 3:
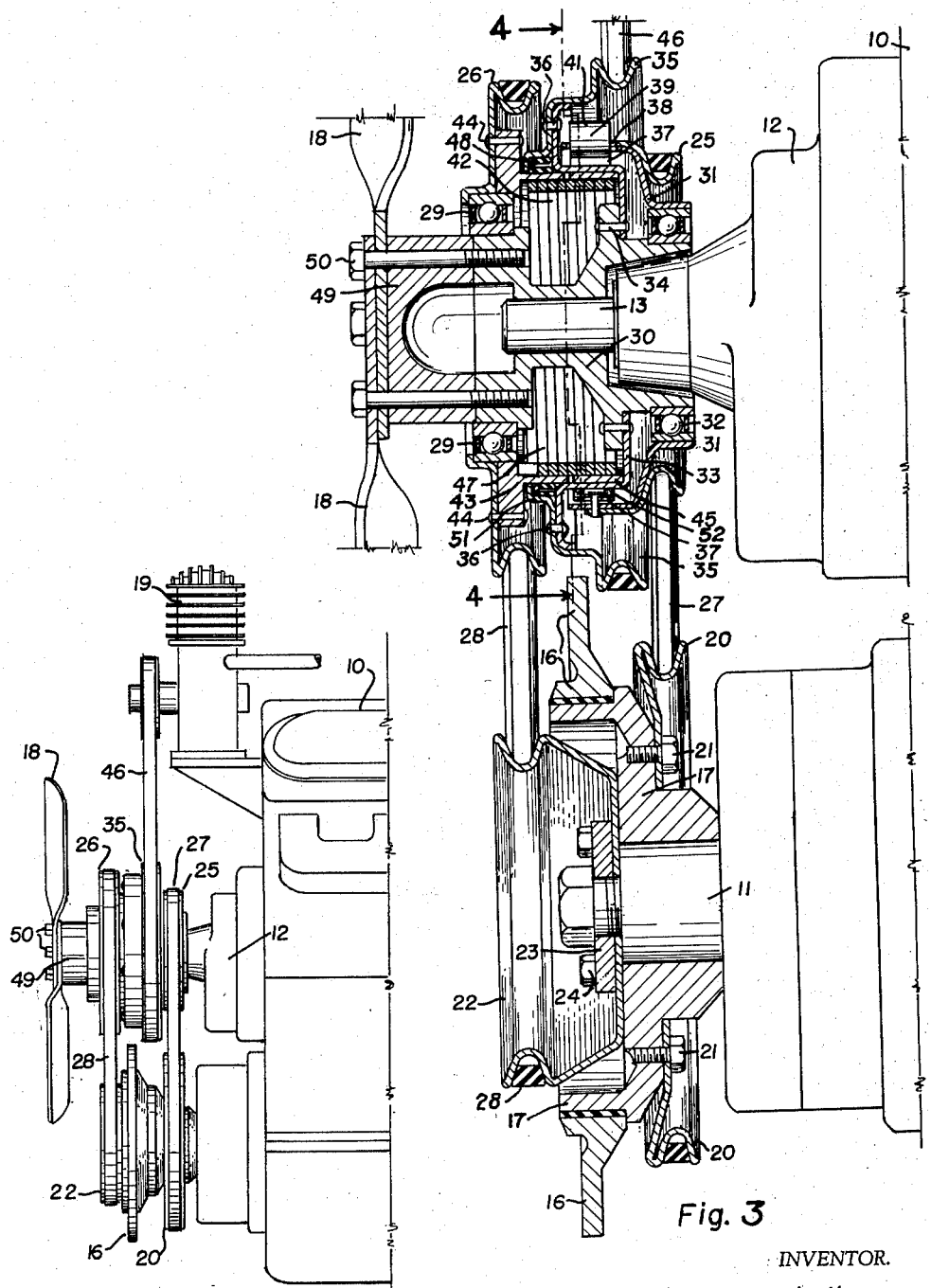
Fig. 1 is a fragmentary side view showing the forward extremity of a conventional automotive engine in outline with the improved accessory drive in place thereon.
Fig. 3 is an enlarged vertical section through the improved drive, taken on the line 3—3, Fig. 1.
Figure 2:
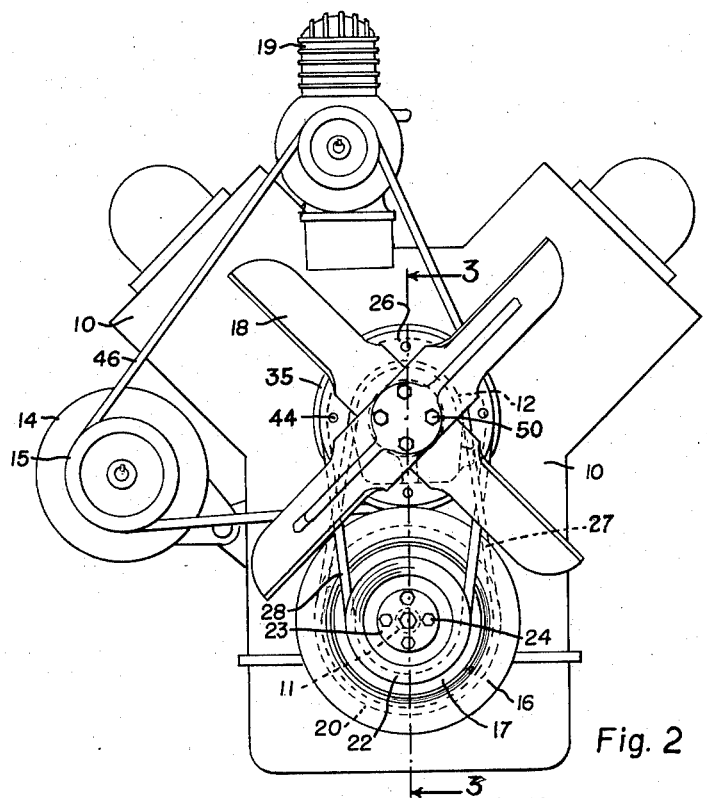
Fig. 2 is a similar front view thereof.
Figure 4:
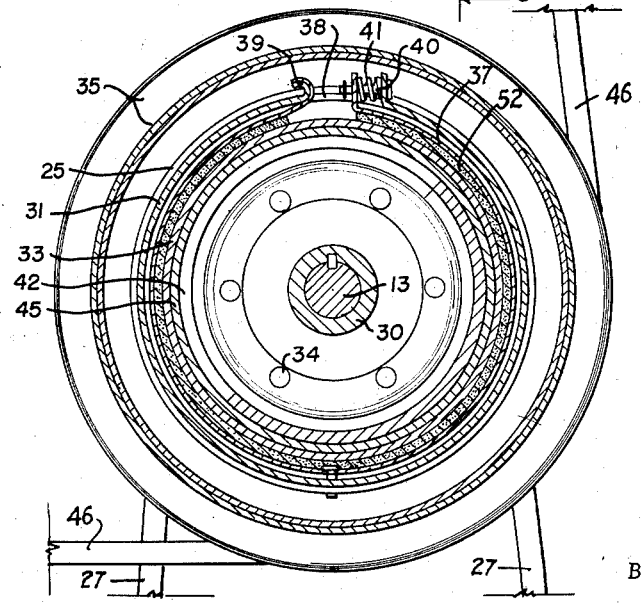
Fig. 4 is a similarly enlarged cross-section through the upper portion of the improved drive, taken on the line 4—4, Fig. 3.

In the drawing conventional parts of an automotive vehicle have been indicated and designated by numeral as follows: Engine 10, crankshaft 11, water pump 12, water pump shaft 13, generator 14, generator shaft pulley 15, vibration dampener 16, vibration dampener flange 17, motor cooling fan 18, and cooling fan hub 49. Accessory equipment such as a Freon compressor 19 may be mounted on the engine 10 to be driven from the crankshaft 11.

This invention relates to means for transmitting power from the crankshaft 11 to the water pump shaft 13, the generator shaft pulley 15, the motor cooling fan 18, the Freon compressor 19, and to any other desired accessory equipment, at a high speed ratio when the crankshaft is rotating below a predetermined speed and at a low speed ratio when the crankshaft is exceeding the predetermined speed.

The invention contemplates concentrically securing a relatively large V-belt drive pulley 20 to the rear face of the vibration dampener flange 17, by means of suitable cap screws 21, and a relatively small concentric V-belt drive pulley 22 to the front face of the flange 17 by means of a clamp plate 23 and suitable cap screws 24. The small drive pulley 22 is deeply dished to position its V-belt groove, well forward of the dampener flange 17.

The drive pulleys 20 and 22 transmit rotation to a high speed driven pulley 25 and a low speed driven pulley 26, respectively, by means of matched V-belts 27 and 28, respectively. The driven pulleys 25 and 26 are mounted concentrically of the water pump shaft 13. In a typical installation, the drive pulley 20 would have a pitch diameter of 6½"; the small drive pulley 22, 4"; the driven pulley 25, 4"; and the driven pulley 26, 6".

The driven pulley 26 is mounted by means of a forward ball bearing 29 upon the forward extremity of a hub member 30 which is keyed or otherwise fixedly-mounted on the water pump shaft 13. The driven pulley 25 is affixed to a bowl-shaped clutch housing 31 having a cylindrical clutch portion. The housing is rotatably mounted on the rear extremity of the hub member 30 by means of a rear ball bearing 32. The hub 49 of the engine cooling fan 18 is secured to the forward extremity of the hub member 30 by means of suitable cap screws 50 so that the fan rotates as a unit with the water pump shaft 13.

Thus, it can be seen that either driven pulley 25 or 26 can rotate freely and independently of the hub member 30 and the pump shaft 13, and that due to the diametric ratios, the driven pulley 25 is rotating at a higher speed than the driven pulley 26. Thus the speed of the water pump shaft 13 will be dependent upon which of the driven pulleys are connected therewith.

The connection is accomplished by means of an annular clutch drum member 33 which is fixedly mounted on the hub member 30 by means of rivets 34 which extend through a flange formed on the hub member 30. The clutch drum member 33 extends forwardly to form a cylindrical clutch drum portion thence radially outward to form a peripheral flange to which an accessory drive pulley 35 is secured, such as by means of suitable rivets 36. The accessory drive pulley is used for driving any desired accessory equipment. As illustrated, an accessory drive belt 46 is trained around the pulley 35, the generator shaft pulley 15, and around the drive pulley of the Freon compressor 19 and in the typical installation, the accessory drive pulley 35 has a pitch diameter of 6½".

The cylindrical portion of the clutch housing 31 is spaced from the cylindrical clutch drum portion of the clutch drum member 33 to form an annular band chamber therebetween. A flexible clutch band 37, provided with suitable clutch lining 52, is positioned in the annular band chamber about the clutch drum member 33. The extremities of the clutch band 37 are extended outwardly through an opening 38 formed in the clutch housing 31. One extremity of the band is hooked around the leading edge of the opening, as shown at 39. The other extremity is mounted on a slide pin 40 supported from the housing at the trailing edge of the opening 38. The latter extremity of the band is constantly forced forwardly on the pin 40 by means of a suitable band spring 41 so as to tend to contract the clutch band 37 into frictional engagement with the clutch drum member 33.

It can be seen from the above, that the forward (clockwise) rotation of the driven pulley 25 will act to draw upon the leading end of the clutch band to "cinch" it around the clutch drum to transmit power through the clutch housing 31, the band 37, the clutch drum member 33 and the hub member 30 to drive the pump shaft 13 and the fan 18 forward at multiplied speed. The accessory drive pulley 35, since it is secured to the clutch drum member 33, will also be driven forwardly at multiplied speed.

However, when the speed of rotation reaches a predetermined point, centrifugal force will act to urge the band radially outward, compressing the band spring 41 and expanding the radius of the clutch band, so that the frictional engagement will be released so as to disconnect the shaft 13 from the high speed driven pulley 25 so that it may be connected to the low speed driven pulley 26.

This is accomplished by means of a spiral clutch spring 42 positioned within the circumference of a hardened clutch cup 43 secured to the low speed driven pulley 26, as by means of suitable rivets 44, and a hardened liner sleeve 45 fixedly mounted in the clutch drum member 33. The cup 43 and the sleeve 45 are in annular alignment with each other and the clutch spring 42 extends into both. One extremity of the clutch spring is secured to the cup 43, the other extremity being free. The direction of spiral of the clutch spring is such that forward (clockwise) rotation of the cup 43 will tend to unwind the spiral provided the sleeve 45 is rotating at a slower speed so that the free extremity will be retarded by frictional engagement with the slower moving sleeve 45. This "unwinding" action will increase the diameter of the clutch spring causing it to internally grip the sleeve 45 and carry the accessory drive pulley 35 forward with the low speed driven pulley 26 while the high speed driven pulley over-rides the clutch drum member. The gripping action of the clutch spring will become progressively greater as the speed increases, due to centrifugal force. When the high speed driven pulley 25 is driving, the clutch drum acts to reduce the diameter of the clutch spring 42 and over-ride the latter.

In the typical installation referred to, at engine speeds of less than 1000 r.p.m., the low speed pulley 26 idles on the forward bearing 29 and the clutch spring 42 slips or over-rides. Since the hub member 30 is also rotating forwardly, the bearing 29 has relatively small movement, seldom over 750 r.p.m.

When the engine speed exceeds 1000 r.p.m., the clutch band 37 will release its load and allow the clutch spring 42 to "take over" and drive the pump shaft 13 and the accessory drive pulley 35 at the speed of the low speed driven pulley 26 while the high speed driven pulley 25 idles freely on the rear bearing 32. The latter bearing will always operate at less than the speed of the pulley 25 since the hub member is also rotating forwardly at lesser speed. Should the clutch band slip momentarily when taking over its load, due to moisture, grease, etc., the spiral clutch spring will take over the load and no damage or loss will occur.

The hub member 30 is reduced in diameter at its middle to form a large lubricant reservoir 47 to provide permanent lubrication for the unit. Leakage of grease or other lubricant is prevented by means of a resilient expansible sealing ring 48 positioned between the clutch cup 43 and the clutch drum member 33 in a ring channel 51 formed on the member 33. The sealing ring 48 will be subjected to some pressure at high speeds due to centrifugal force; however, at high speeds, the clutch drum member 33 and the clutch cup 43 will be rotating at the same speed so that the sealing ring will not be subjected to sliding contacts thus, maximum sealing and minimum wear will be provided.

The clutch band 37 is protected by the pulley 35 and the clutch housing 31 from moisture, grease and external abrasive material and the clutch spring 42 is similarly protected by being completely seated in the lubricant reservoir 47.

It is desired to call attention to the position of the clutch actuating spring 41. The axis of this spring is positioned tangent to its circumferential path of rotation so as to eliminate centrifugal effect upon the tension of the spring.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. Means for driving accessory equipment from the crankshaft of the engine of an automotive vehicle comprising: a first drive pulley; a second drive pulley, said first drive pulley being of smaller diameter than said second pulley; means concentrically securing said pulleys to the crankshaft in spaced-apart relation; an accessory shaft positioned parallel to said crankshaft; a first driven pulley; a second driven pulley, said first driven pulley being of larger diameter than said second driven pulley; means rotatably mounting said driven pulleys on said accessory shaft; a first endless belt trained about said first drive and driven pulleys; a second endless belt trained about said second drive and driven pulleys; a centrifugally-releasable clutch interposed between said second driven pulley and said accessory shaft to rotate the latter, said centrifugally releasable clutch being arranged to release when a predetermined speed is reached; and a second clutch interposed between said first driven pulley and said accessory shaft to rotate said accessory shaft when the latter is released by said centrifugally-releasable clutch, said accessory shaft comprising the shaft of one piece of accessory equipment and having an accessory drive pulley affixed to said accessory shaft for driving a second piece of accessory equipment.

2. Means for driving accessory equipment as described in claim 1 in which the second clutch comprises a clutch cup concentrically mounted on said second driven pulley; a clutch drum mounted on said accessory shaft in longitudinal alignment with said clutch cup; a spiral clutch spring contained within said drum and said cup and secured at its one extremity to said cup so that when the speed of the cup exceeds the speed of the drum said spring will expand to frictionally engage both said cup and said drum.

3. Means for driving accessory equipment as described in claim 2 in which the centrifugally releasable clutch comprises a cylindrical clutch housing mounted to rotate about the axis of said accessory shaft and concentrically surrounding said clutch drum in spaced-relation thereto; an annular clutch band positioned between said drum and said housing; means for causing said clutch band to rotate with said housing; and resilient means urging said band into frictional engagement with said drum against the bias of centrifugal force.

4. Means for driving accessory equipment as described in claim 3 in which the second driven pulley is mounted on and supported by said clutch housing.

5. Means for driving accessory equipment as described in claim 4 in which the accessory drive pulley is mounted on and supported by said clutch drum.

6. Means for driving accessory equipment as described in claim 6 in which the first driven pulley is mounted on and supported by said clutch cup.

7. Means for driving accessory equipment as described in claim 6 having a hub member affixed to said accessory shaft; a first ball-bearing assembly journalling said first driven pulley on said clutch cup and a second ball-bearing assembly journalling said clutch housing on said hub member.

8. Means for driving accessory equipment as described in claim 7 having an air circulating fan mounted on said hub member.

9. Means for driving accessory equipment as described in claim 8 in which the clutch drum is fixedly mounted on said hub member intermediate said ball-bearing assemblies so as to form with said clutch cup, a lubricant chamber about said clutch spring.

10. Means for driving accessory equipment as described in claim 9 having a lubricant sealing device between said clutch drum and said clutch cup for retaining lubricant in said lubricant chamber.

References Cited in the file of this patent

UNITED STATES PATENTS

| | | |
|---|---|---|
| 1,983,827 | Withher et al. | Dec. 11, 1934 |
| 2,694,175 | Davis | Nov. 9, 1954 |
| 2,694,937 | Birbaum | Nov. 23, 1954 |